US012437115B2

(12) United States Patent
Tafreshian et al.

(10) Patent No.: US 12,437,115 B2
(45) Date of Patent: Oct. 7, 2025

(54) REMOTE CONFIGURATION CHANGES OVER A SECURITY LAYER

(71) Applicant: MICROSOFT TECHNOLOGY LICENSING, LLC, Redmond, WA (US)

(72) Inventors: Farzam Tafreshian, Seattle, WA (US); Rachel Ruth Slater, Seattle, WA (US); Prasidh Arora, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 161 days.

(21) Appl. No.: 18/148,377

(22) Filed: Dec. 29, 2022

(65) Prior Publication Data

US 2024/0061960 A1 Feb. 22, 2024

Related U.S. Application Data

(60) Provisional application No. 63/373,198, filed on Aug. 22, 2022.

(51) Int. Cl.
G06F 21/64 (2013.01)
(52) U.S. Cl.
CPC .................................. G06F 21/64 (2013.01)
(58) Field of Classification Search
CPC ...................................................... G06F 21/64
See application file for complete search history.

(56) References Cited

U.S. PATENT DOCUMENTS

| 8,010,989 B2* | 8/2011 | Adams ................ H04W 12/084 455/410 |
| 8,418,168 B2 | 4/2013 | Tyhurst et al. |
| 9,374,390 B1 | 6/2016 | Teal et al. |
| 10,958,501 B1* | 3/2021 | Richardson ............. H04L 67/02 |

(Continued)

FOREIGN PATENT DOCUMENTS

| CN | 105634745 A | 6/2016 |
| CN | 104573494 B | 2/2018 |

(Continued)

OTHER PUBLICATIONS

"International Search Report and Written Opinion Issued in PCT Application No. PCT/US2023/028304", Mailed Date: Oct. 9, 2023, 13 Pages.

*Primary Examiner* — Viet D Vu
(74) *Attorney, Agent, or Firm* — Han Gim; Newport IP, LLC (57) ABSTRACT

An application management platform remotely manages a computing device. A request is received to update a configuration of the computing device. It is determined that the computing device is executing a security layer that restricts execution of code on the computing device to an explicit list of software. A script is dynamically selected that fulfills the request to update the configuration of the computing device. The script is signed with a certificate of the application management platform. The script is sent to the computing device. The security layer is configured to allow execution of scripts signed with the certificate of the application management platform, thereby allowing the computing device to execute the script while the security layer is executing.

20 Claims, 6 Drawing Sheets

(56) References Cited

U.S. PATENT DOCUMENTS

| | | | | |
|---|---|---|---|---|
| 2003/0167257 | A1* | 9/2003 | de Bonet | G06F 16/9574 |
| 2008/0288599 | A1* | 11/2008 | Kutchmark | H04L 67/565 |
| | | | | 709/206 |
| 2013/0205362 | A1 | 8/2013 | Kiehtreiber et al. | |
| 2013/0227090 | A1 | 8/2013 | Nissler et al. | |
| 2014/0041012 | A1* | 2/2014 | Yeow | H04L 63/02 |
| | | | | 726/11 |
| 2017/0097941 | A1* | 4/2017 | Graves, Jr. | H04L 69/40 |
| 2022/0374522 | A1* | 11/2022 | Samuel | G06F 21/572 |

FOREIGN PATENT DOCUMENTS

| | | |
|---|---|---|
| CN | 114491487 A | 5/2022 |
| EP | 1679634 A2 | 7/2006 |
| EP | 3289510 B1 | 6/2020 |

\* cited by examiner

REMOTE CONFIGURATION CHANGES OVER A SECURITY LAYER

PRIORITY APPLICATION

This application claims the benefit of and priority to U.S. Provisional Application No. 63/373,198, filed Aug. 22, 2022, the entire contents of which are incorporated herein by reference.

BACKGROUND

Infrastructure (e.g., cloud) service providers typically provide application management tools for servers, clusters, containers, and other computing devices and resources. Such application management tools manage target devices by remotely running executable code on the target device. In some cases, code comprised of scripting commands are sent to a target machine's browser for execution. For example, a locally deployed, browser-based application for managing servers, clusters, hyper-converged infrastructure, containers, as well as computing devices can be used. In one example, such a tool manages machines by remotely executing PowerShell (PS) code, which is a scripting language commonly used for automating the management of a system.

It is with respect to these and other considerations that the disclosure made herein is presented.

SUMMARY

Some operating systems include security layers that restrict execution of code to an explicit list of software. The security layers can include policies that block unsigned scripts or restrict programmatic management capabilities, for example, which implement application control methods to reduce the risk of malware, ransomware, and unapproved software. The security layer may therefore block the execution of unsigned code, which prevents the service provider's ability to use application management tools. Additionally, a constrained language mode can block the use of .NET types, dot sourcing, scheduled jobs, Component Object Model (COM) objects, and other capabilities of scripting languages.

In an example, an application management tool implements an execution model that includes PowerShell scripts with compiled JavaScript as files that are loaded into the browser at runtime. When a browser action is initiated (for example, installing an update, or creating a new user), the relevant script is dynamically sent using an encryption protocol down to an HTTPS gateway. The script is then sent to the remote target node (i.e., the machine being managed). However, with some operating systems, a security layer may be turned on by default. Such a security layer can be a software-based security layer that enforces an explicit list of software that is allowed to run and is designed to protect machines against malware and other untrusted software. Application control can help mitigate these types of security threats by restricting the applications that users are allowed to run and the code that runs in the kernel. However, such application control policies block unsigned scripts or signed scripts if the script is not allow listed in a policy via a rule (e.g., the signature/publisher rule) and restrict some scripts (e.g., PowerShell scripts) from running in constrained language mode. This imposes restrictions as to how code can be executed in an environment, blocking the remote execution of unsigned code and preventing the existing model for managing infrastructure.

Various embodiments are disclosed herein for a mechanism that enables management systems to support security enforced environments as described above by providing techniques for enabling remote execution of scripts for infrastructure-based application management platforms. These techniques enable infrastructure-based (e.g., cloud-based) application management platforms to dynamically execute scripts on remote devices using signed scripts. The remote execution of the signed scripts is performed without pre-deployment requirements on the target device while maintaining performance of the application management platforms.

These and various other applications will be apparent from a reading of the following Detailed Description and a review of the associated drawings. This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

The following Detailed Description describes technologies that enable remote execution of scripts for infrastructure-based application management platforms. The techniques enable infrastructure-based application management platforms to dynamically execute scripts on remote devices using signed scripts. The remote execution of the signed scripts is performed without pre-deployment requirements on the target device while maintaining performance of the application management platforms. As used herein, "management" in the context of application management can refer to both read and write operations, e.g., a configuration update is a write operation, and a request to return a list of users (a read operation) is also a management operation. "Script" refers to a program or series of instructions that can be executed in a system, process, or program without being compiled.

In an embodiment, the security layer policy enforced on the target device allow lists (e.g., includes in the deployed policy) the main certificate of the application management platform as a signer rule. Thus, signed code and files from the application management platform that are to be trusted by the remote device are explicitly identified in the security layer policy. As a result, only static, tangible entities can be signed (e.g., code content must be contained within a file to be signed). To maintain signature validity, the file cannot be changed.

In many application management platforms, signed code and files are generated dynamically such that a user at the target device is able to trigger the generation of code at the application management platform with a variable set of inputs/outputs at any time. For example, a user may select an option to scan for all available system updates for a target device. If the target device is executing a constrained language mode, the application management platform locates the corresponding signed script, which is needed to perform the action, and causes the script file to be transferred to the target device. The target device receives the signed script and the security layer at the target device determines that the signature matches what is included in the policy. The script is trusted based on the enforced policy.

In some embodiments, transferred signed scripts are linked with a version identifier using a custom file hierarchy for the transferred signed scripts, for example, using a Universal Naming Convention (UNC) network path. When a signed script is identified for the target device, an internal mapping is used to ensure that the target device is receiving the correct version of the signed scripts. In some embodiments, a custom class/code is written for determining 1) that all installed modules (e.g., available for dynamic transfer/execution) at a given time and 2) for determining modules specific to cluster connections via nested parameters set in the gateway's manifest.

In some embodiments, script transfer results are cached, for example by using the target device's Uniform Resource Locator (URL) as a key, and in response to subsequent incoming requests, the cache is checked before proceeding. In some embodiments, multiple caches are implemented. One cache is for the mode of the target node which has a sliding expiration policy. If the mode of a managed node changes (e.g., from OFF→Enforcement Mode), in some embodiments, after an idle period (e.g., no administration center usage) of, for example 30 seconds, the updated mode is implemented and the flow adjusted accordingly. In other embodiments, an idle period is not implemented. If the managed node is enforced, then a second cache is implemented that caches all the required configuration information (such as directory, cluster information, etc.) as a preparation or requirement for the new dynamic on-the-fly transfer.

In some implementations, the target device is actually a cluster of devices, rather than a single device. If it is determined that the target device is a cluster of devices, in one embodiment, all internally mapped modules are transferred to all the cluster nodes that were up and running. In some embodiments, the cluster's fully qualified domain name (FQDN) is used to distinguish between cluster vs. non-cluster connections for proper handling of module transfers. As used herein, a module is a section or grouping of code or script that can be saved or transferred, and can be a component of a larger program or system.

In some embodiments, upon connecting to a cluster, it is confirmed that the connection is a cluster type. This determination can be cached. In an embodiment, a Fully Qualified Domain Name (FQDN) for a cluster of computing devices may be used to distinguish between cluster and non-cluster connections. If it is determined that the connection is a cluster type, a remote PowerShell session is opened on the cluster itself and a command is run to determine the resolved Domain Name System (DNS) for the cluster name in that snapshot in time. Then, using this resolved name, this connection is treated the same way as a single server connection, via the described dynamic on-the-fly approach.

As this implementation is based upon file transfer, the Server Message Block (SMB) file sharing protocol (also referred to as SMB over transmission control protocol (TCP), or 'SMB-In') allows inbound traffic on port 445 on the managed server. Thus, the disclosed embodiments incorporate a validation of the state of this firewall rule, and advises the user if this needs to be modified to facilitate successful transfer of signed modules. In some embodiments, a synchronous module transfer deployment method is implemented. Synchronous module transfer allows for quick transfer of a requested module "on-the-fly" before the corresponding signed PS script is executed on the managed node. This is accomplished by using synchronous application programming interfaces (APIs) to identify the signed module files from local gateway installation directories and transfer a default module directory on the managed (target) device.

In some embodiments, an asynchronous module transfer deployment method is implemented. The asynchronous module transfer allows for transfer of commonly used modules to a single connection. This method enables efficiency by verifying each module in a multiple-module transfer, where the requested modules are batched and transferred in parallel to reduce transfer time. Additionally, errors for module transfers can be detected before initiating transfers so that corrections can be made prior to transmission and necessary clean up can be performed upon failure. In some embodiments, a new property is associated with each module defined in the gateway's manifest, which allows for showing or hiding specific or supported modules within a given type of connection.

The disclosed technologies represent a substantial advantage over existing systems where dynamic application management is desired while running a security layer. Existing systems can have shortcomings that require inefficient workarounds that exacerbate computing resource issues including the overuse of processing resources as well as the finite nature of local storage space. It can be appreciated, therefore, that the disclosed technologies represent a substantial advance toward reducing processor and storage usage associated with providing applications and functions on computing devices and virtualized resources.

Figure 1A:
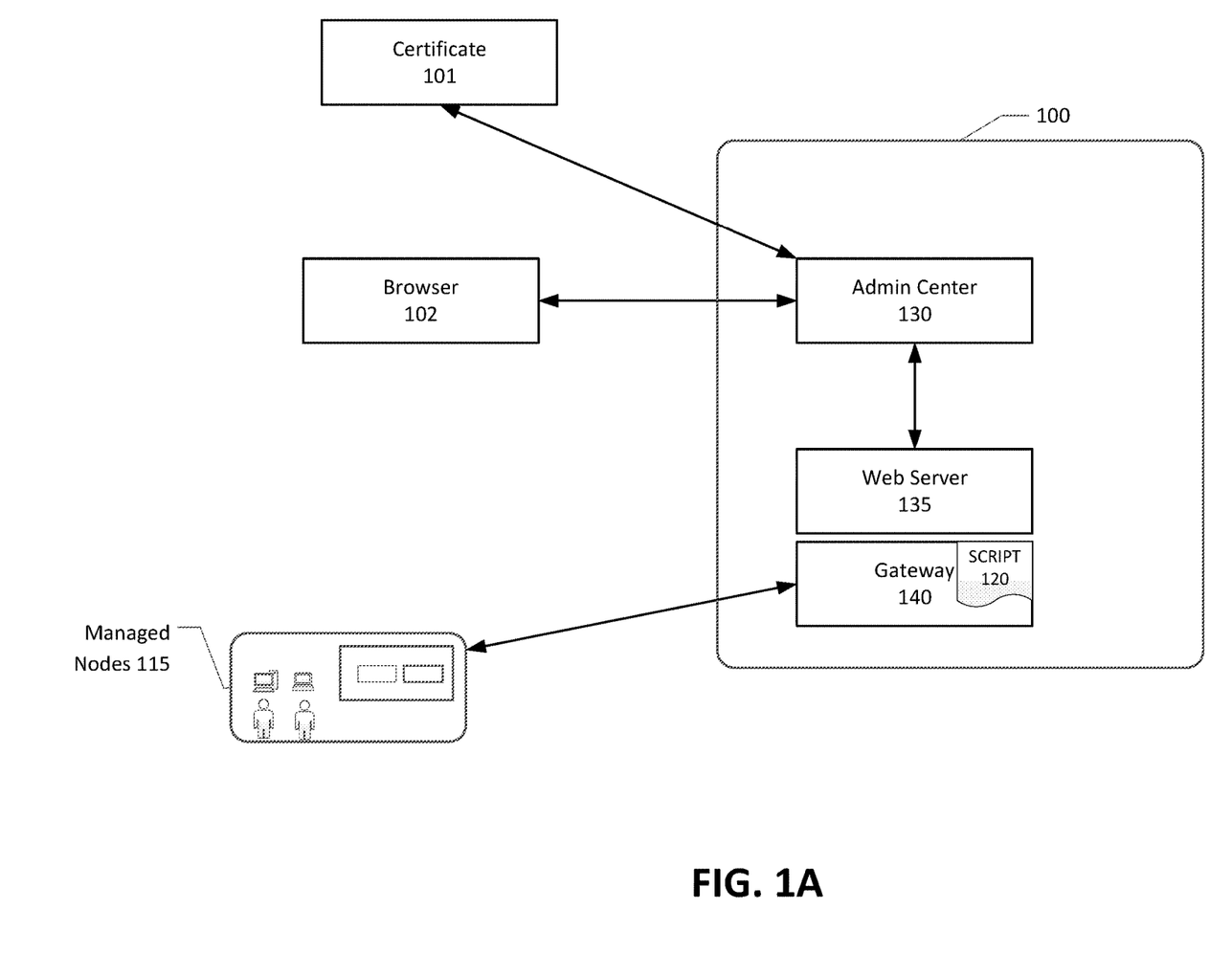
FIG. 1A illustrates an example system in accordance with the disclosure.

Turning to FIG. 1A, illustrated is an example of an administration platform 100. Administration platform 100 is also referred to herein as an application management platform. Administration platform 100 includes an administration center 130 that signs binaries using provider-signed certificate 101. Scripts 120 are signed as part of the release process and available on the gateway 140. Scripts 120 are sent remotely for execution to managed nodes 115. The various components of FIG. 1A can also be combined as single components. For example, gateway 140 can be the same component as administration center 130.

When a security layer runs at the target device, the scripts 120 can be blocked by the enforced security policies. This means that only explicitly allow listed applications and files can be executed in these environments. Any static files to be allow listed must be signed such that the signature matches what is specified in the policy. This conflicts with the desired administration platform execution model which is based on dynamically sending unsigned script contents to the target node—e.g., the contents are not a static file, and thus, cannot be signed. In addition, it is desired to maintain the dynamic nature of script requests and execution of a given management action—e.g., a user should be able to trigger an action with a variable set of inputs/outputs at any time. Additionally, it is desired to avoid pre-deployment requirements for managing a node.

Figure 1B:
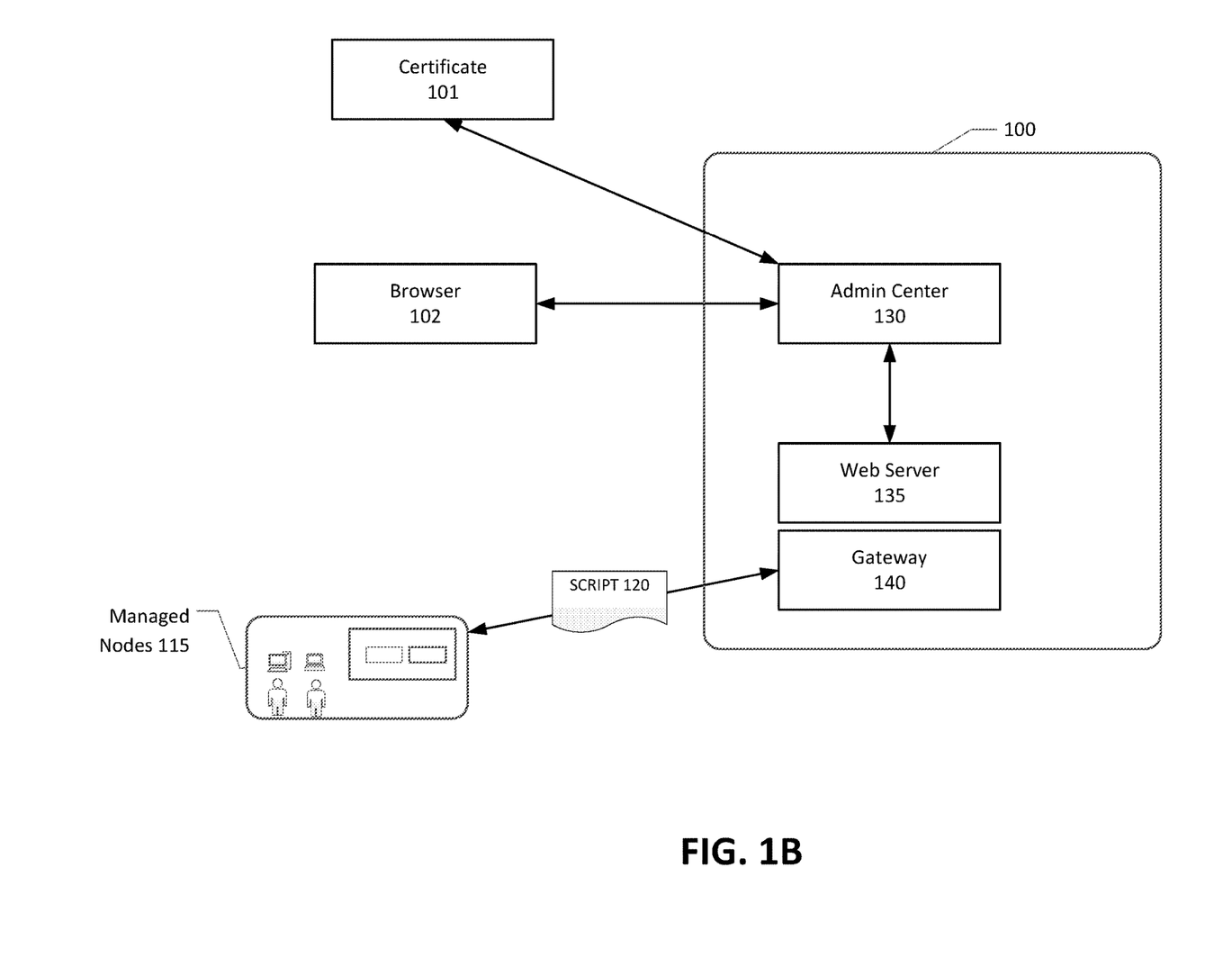
FIG. 1B illustrates an example system in accordance with the disclosure.

As described in more detail herein and as illustrated in FIG. 1B, the disclosed embodiments enable the administration center 130 to dynamically send and execute scripts 120 on remote managed nodes 115 using signed scripts, while maintaining performance and without pre-deployment requirements on the target nodes 115. In the present disclosure, the policy enforced on the machine being managed allow lists (e.g., include in the deployed policy) the main certificate 101 of the administration in center 130 as a signer rule. When the administration center client is installed on a machine, an additional third-party signer rule is allow listed in the deployed policy. The incorporation of the administration center's certificate signature indicates to the target system that signed files (in this example, the scripts) should be allowed to run.

In an example, a user can click a button on a user interface to scan for all available system updates for a target machine. If this machine is in an enforced mode, the disclosed embodiments will determine the mode, and in real-time, locate the corresponding signed script from the gateway 140 that is needed to perform the desired action. This signed script file is transferred to the target machine. As the signature matches that which is included in the policy, the code is trusted. In some embodiments, unsigned script contents are sent to the target node, but are prevented from execution if the signature does not match what is included in the policy. In other embodiments, unsigned script contents originating in the browser are not sent to the target node, because the action is executed by running the safe and trusted code inside the signed file which resides on the machine itself.

In an embodiment, transferred modules are linked with a version. The linking uses a custom file hierarchy for the transferred module using a Universal Naming Convention (UNC) network path. In response to execution of a script in an enforced machine, built-in application programming interfaces (APIs) are used to determine the corresponding module version based on the version that was available when the administration center 130 was installed on the gateway 140 using an internal mapping. The administration center 130 ensures that the signed scripts for this specific version of the requested module are present on the enforced target machine. The remote execution of this module's version can be triggered to complete the request. Using this mechanism, version updates can be supported by updating the version linked to a specific module within the internal mapping and the process can be repeated to ensure correctness.

If there is no API to determine whether security layers are active, other methods can be used to make this determination. For example, after authenticating the user and creating a remote session on the managed node, the default Language Mode of that session can be determined. Operating system properties are used to check the values for various properties such as Policy Enforcement Status. Such properties can be used alone or in combination to determine the security layer mode to ensure that the disclosed embodiments are implemented if the security layer is active. In an embodiment, security layer mode and associated properties are cached for later requests.

Figure 2:
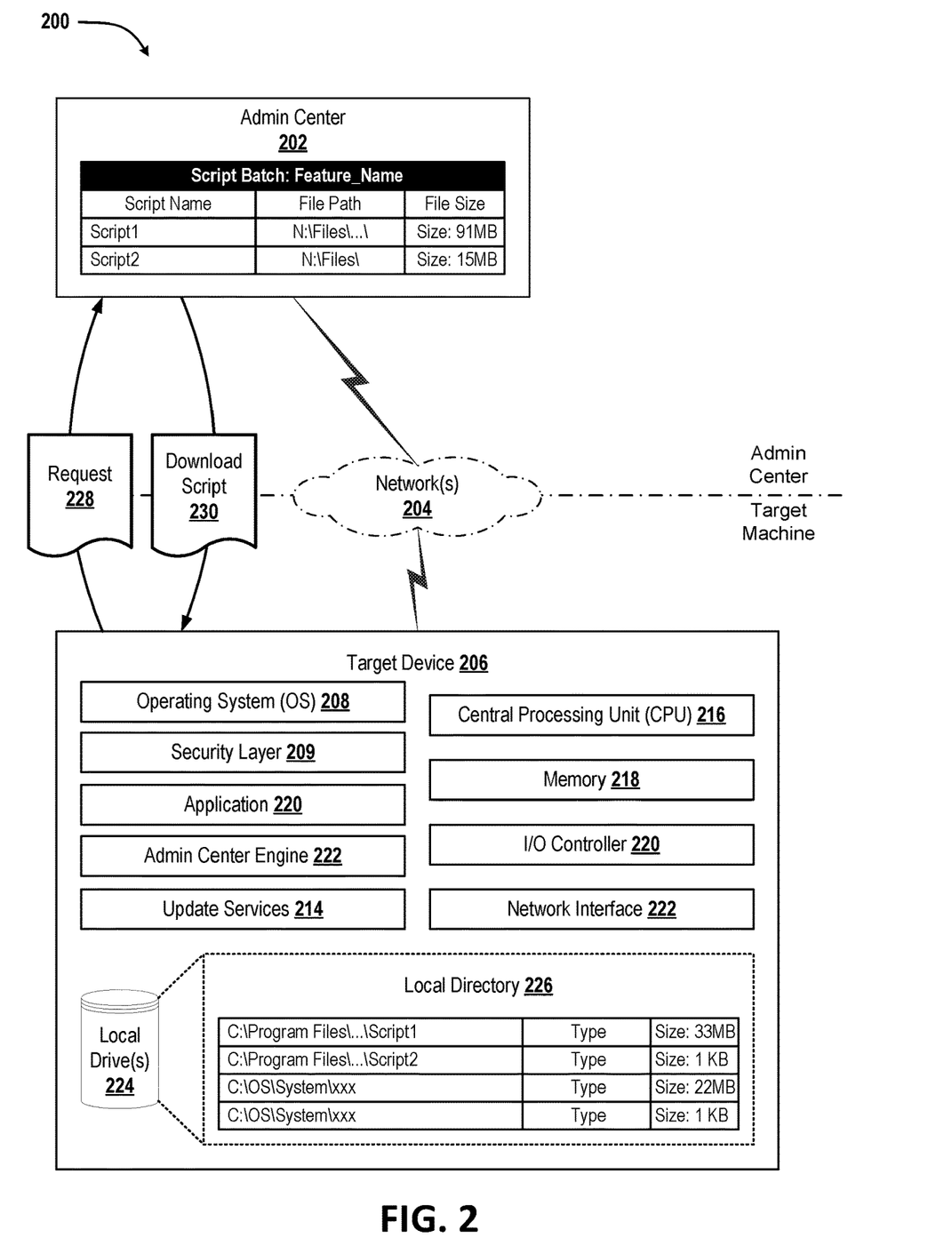
FIG. 2 illustrates an example system in accordance with the disclosure.

Turning now to FIG. 2, illustrated is a system 200 for enabling a target device 206 to dynamically receive scripts in accordance with the disclosure. In the illustrated example, a first script 230 that corresponds to a file titled "Script1" is received from administration center 202 and stored in the local drive 224 of the target device 206. The respective scripts such as Script1 and Script2 include, for example, binaries, permissions, registry settings, extension settings, and other data that is usable to run the script. In some embodiments, the scripts include metadata that indicates properties of the corresponding script files.

In some implementations, the target device 206 utilizes an administration center engine 222 configured to manage the retrieval of scripts when requests are issued for updates on the target device 206. For example, the administration center engine 222 causes a request 228 to be transmitted to an administration center 202 that is associated with a particular service or feature.

The request 228 can omit any specific identification of the individual scripts as the computing device may not have specific information about the scripts at the administration center 202. In response to receiving the request 228, the administration center 202 identifies a predefined script or a predefined batch of scripts in response to the request 228. For example, as illustrated, the administration center 202 determines that the request can be fulfilled by a script named "Script1." In some embodiments, the administration center 202 returns the download script 230 in the form of a compressed file to increase the speed at which the entire batch of application files becomes available on the target device 206.

In response to receipt of the download script 230, the target device 206 stores the script onto the local drive 224 (e.g., a hard disk, a solid-state hard drive, or any other suitable volatile or non-volatile storage medium).

In some implementations, the target device 206 further includes update services 214 that are configured to automatically update various components such as, for example, the OS 208, security layer 209, and/or the application 220. In some embodiments the security layer 209 is part of the operating system 208.

As further illustrated, the target device 206 includes a central processing unit (CPU) 216 that is connected, via a bus (not shown in FIG. 2), to various components such as the local drive 224, a memory 218, an input/output (I/O) controller 220, and/or a network interface 222. It can be appreciated that the system components described herein (e.g., the application(s) 220, the OS 208, and/or the administration center engine 222) may, when loaded into the CPU 216 and executed, transform the CPU 216 and the overall target device 206 from a general-purpose computing system into a special-purpose computing system customized to facilitate the functionality presented herein. The CPU 216 can be constructed from any number of discrete circuit elements, which can individually or collectively assume any number of states. More specifically, the CPU 216 can operate as a finite-state machine, in response to executable instructions contained within the software modules disclosed herein. These computer-executable instructions transform the CPU 216 by specifying how the CPU 216 transitions between states, thereby transforming the discrete hardware elements constituting the CPU 216.

The local drive 224 and associated computer-readable media provide non-volatile storage for the target device 206.

Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the system 200. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, RF, infrared and other wireless media. Combinations of the any of the above are also included within the scope of computer-readable media.

By way of example, computer storage media includes volatile and non-volatile, removable and non-removable media implemented in any method or technology for storage of information such as computer-readable instructions, data structures, program modules or other data. For example, computer storage media includes random access memory (RAM), read-only memory (ROM), erasable programmable read-only memory (EPROM), electrically erasable programmable read-only memory (EEPROM), flash memory or other solid-state memory technology, compact disc read-only memory (CD-ROM), digital versatile disks (DVD), high definition (HD)-DVD, BLU-RAY, or other optical storage, magnetic cassettes, magnetic tape, magnetic disk storage or other magnetic storage devices, or any other medium which can be used to store the desired information and which can be accessed by the target device 206. For purposes of the claims, the phrase "computer storage medium," "computer-readable storage medium," and variations thereof, does not include waves, signals, and/or other transitory and/or intangible communication media, per se.

The I/O controller 220 receives and processes input from a number of other devices, including a keyboard, mouse, or electronic stylus (not shown in FIG. 2). Similarly, the I/O controller 220 provides output to a display screen (e.g., to display the file-browser GUI described herein), a printer, or other type of output device (also not shown in FIG. 2). The network interface 222 enables the target device 206 to connect to one or more network(s) 204 such as a local area network (LAN), a wide area network (WAN), a wireless local area network (WLAN), or any other suitable network for passing information between the target device 206 and the application provider(s) 202.

Figure 3:
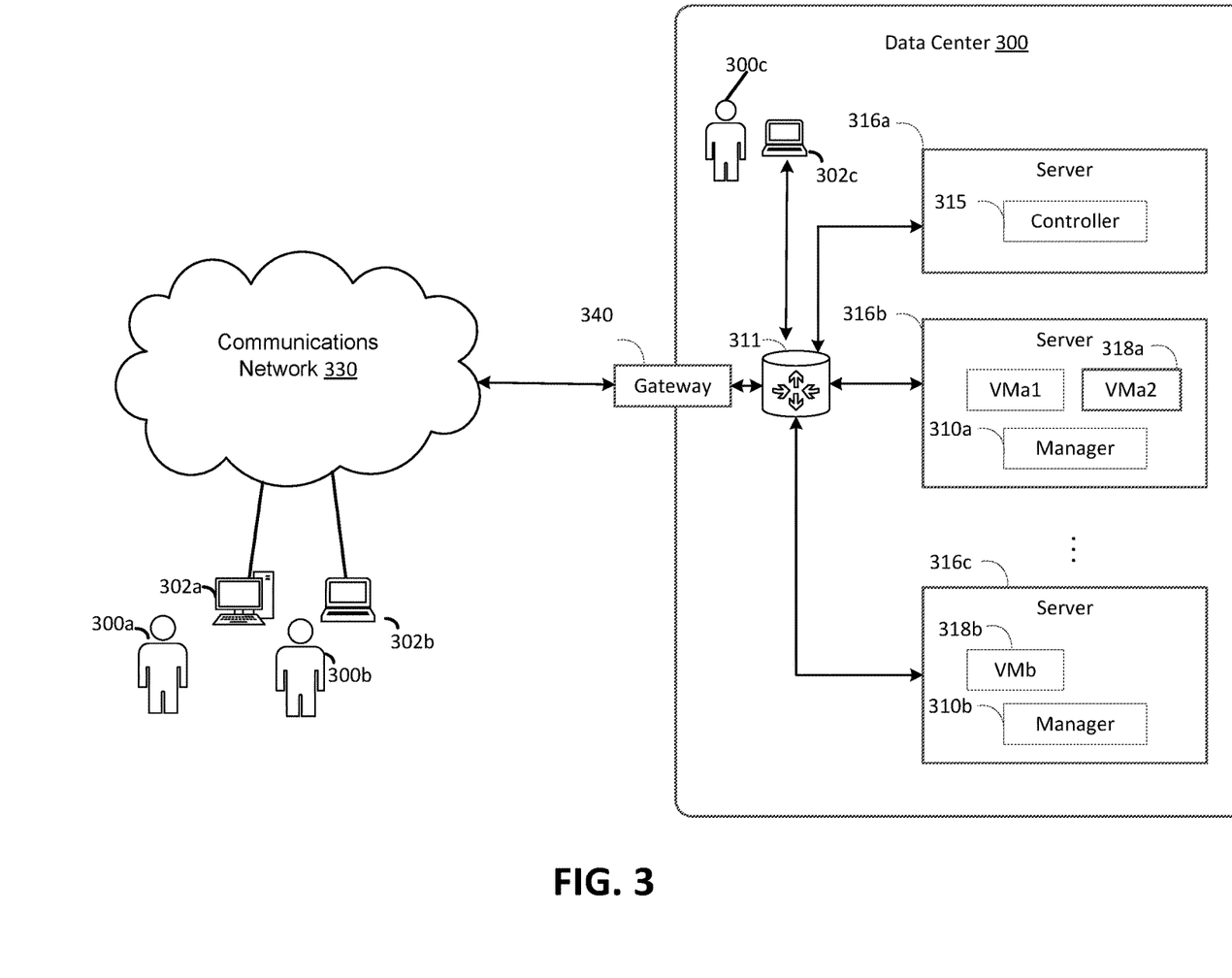
FIG. 3 is a diagram illustrating an example network in accordance with the present disclosure.

FIG. 3 illustrates an example computing environment in which the embodiments described herein are be implemented. FIG. 3 illustrates a data center 300 that is configured to provide computing resources to users 300a, 300b, or 300c (referred singularly as "a user 300" or in the plural as "the users 300") via user computers 302a, 302b, and 302c (referred to singularly as "a computer 302" or in the plural as "the computers 302") via a communications network 330. The computing resources provided by the data center 300 includes various types of resources, such as computing resources, data storage resources, data communication resources, and the like. Each type of computing resource is general-purpose or available in a number of specific configurations. For example, computing resources are made available as virtual machines. The virtual machines are configured to execute applications, including Web servers, application servers, media servers, database servers, and the like. Data storage resources include file storage devices, block storage devices, and the like. Each type of computing resource is available in different configurations, such as the number of processors, and size of memory and/or storage capacity. The resources, in some embodiments, are offered to clients in units referred to as instances, such as virtual machine instances or storage instances. A virtual computing instance is referred to as a virtual machine and can comprise one or more servers with a specified computational capacity (specified by indicating the type and number of CPUs, the main memory size and so on) and a specified software stack (e.g., a particular version of an operating system, which runs on top of a hypervisor).

Data center 300 includes servers 316a, 316b, and 316c (referred to singularly as "a server 316" or in the plural as "the servers 316") that provide computing resources available as virtual machines 318a and 318b (referred to singularly as "a virtual machine 318" or in the plural as "the virtual machines 318"). The virtual machines 318 are configured to execute applications such as Web servers, application servers, media servers, database servers, and the like. Other resources include data storage resources (not shown on FIG. 3) and include file storage devices, block storage devices, and the like. Servers 316 also execute functions that manage and control allocation of resources in the data center, such as a controller 315. Controller 315 can be a fabric controller or another type of program configured to manage the allocation of virtual machines on servers 316.

Referring to FIG. 3, communications network 330 can be a publicly accessible network of linked networks and operated by various entities, such as the Internet. In other embodiments, communications network 330 can be a private network, such as a corporate network that is wholly or partially inaccessible to the public.

Communications network 330 provides access to computers 302. Computers 302 can be utilized by users 300. Computer 302a, 302b or 302c can include a server, a desktop or laptop personal computer, a tablet computer, a smartphone, a set-top box, or any other computing device capable of accessing data center 300. User computer 302a or 302b connects directly to the Internet (e.g., via a cable modem). User computer 302c can be internal to the data center 300 and connect directly to the resources in the data center 300 via internal networks. Although only three user computers 302a,302b, and 302c are depicted, it should be appreciated that there may be multiple user computers.

Computers 302 can also be utilized to configure aspects of the computing resources provided by data center 300. For example, data center 300 can provide a Web interface through which aspects of its operation are configured through the use of a Web browser application program executing on user computer 302. Alternatively, a stand-alone application program executing on user computer 302 can be used to access an application programming interface (API) exposed by data center 300 for performing the configuration operations.

Servers 316 are configured to provide the computing resources described above. One or more of the servers 316 are configured to execute a manager 310a or 310b (referred to singularly as "a manager 310" or in the plural as "the managers 310") configured to execute the virtual machines. The managers 320 can be a virtual machine monitor (VMM), fabric controller, or another type of program configured to enable the execution of virtual machines 318 on servers 316, for example.

It should be appreciated that although the embodiments disclosed above are discussed in the context of virtual machines, other types of implementations can be utilized with the concepts and technologies disclosed herein.

In the example data center 300 shown in FIG. 3, a network device 311 is utilized to interconnect the servers 316a and 316b. Network device 311 comprises one or more switches, routers, or other network devices. Network device 311 can also be connected to gateway 340, which is connected to communications network 330. Network device 311 facilitates communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices can be interconnected in other embodiments and OK interconnected in different ways.

It should be appreciated that the network topology illustrated in FIG. 3 has been greatly simplified and that many more networks and networking devices can be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device comprises any combination of hardware or software that can interact and perform the described types of functionality, including desktop or other computers, database servers, network storage devices and other network devices, personal digital assistants (PDAs), tablets, smartphone, Internet appliances, television-based systems (e.g., using set top boxes and/or personal/digital video recorders), and various other consumer products that include appropriate communication capabilities. In addition, the functionality provided by the illustrated modules are in some embodiments combined in fewer modules or distributed in additional modules. Similarly, in some embodiments the functionality of some of the illustrated modules is not provided and/or other additional functionality is available.

Figure 4:
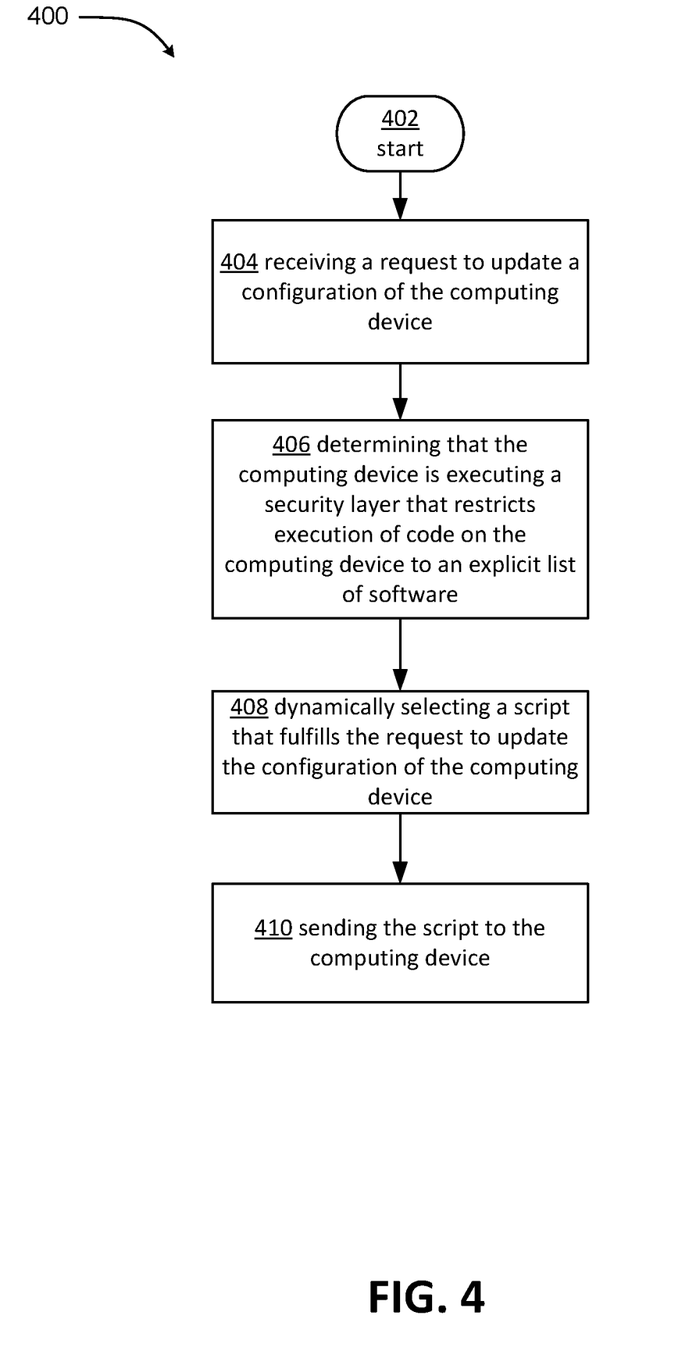
FIG. 4 is a flow diagram of an example method in accordance with the present disclosure.

FIG. 4 is a flow diagram of an example method 400 incorporating the disclosed embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 402, the example method 400 begins.

At block 404, a request is received to update a configuration of the computing device.

At block 406, it is determined that the computing device is executing a security layer that restricts execution of code on the computing device to an explicit list of software.

At block 408, a script that fulfills the request to update the configuration of the computing device is dynamically selected. In an embodiment, the script is signed with a certificate of the application management platform.

At block 410, the script is sent to the computing device. In an embodiment, the script that is signed with the certificate of the application management platform. In an embodiment, the security layer is configured to allow execution of scripts signed with the certificate of the application management platform, thereby allowing the computing device to execute the script while the security layer is executing.

Figure 5:
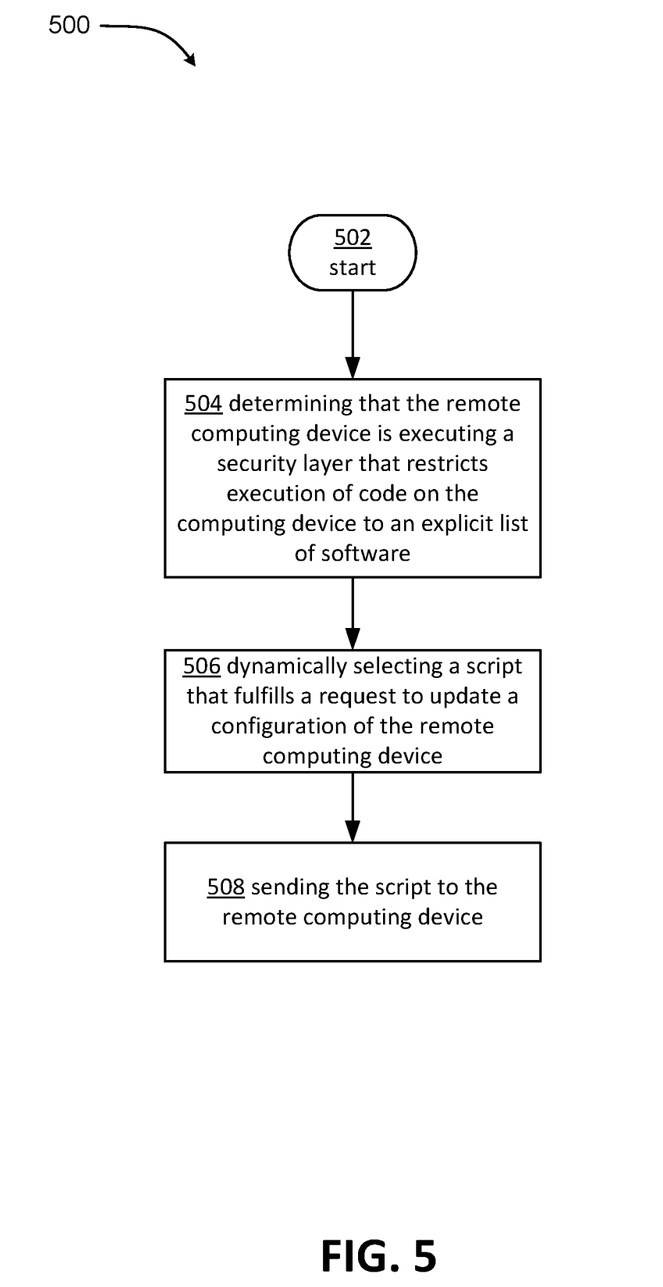
FIG. 5 is a flow diagram of an example method in accordance with the present disclosure.

FIG. 5 is a flow diagram of an example method 500 incorporating the disclosed embodiments. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 502, the example method 500 begins.

At block 504, it is determined that the remote computing device is executing a security layer that restricts execution of code on a remote computing device to an explicit list of software.

At block 506, a script is dynamically selected that fulfills a request to update a configuration of the remote computing device. In an embodiment, the script is signed with a certificate of an application management platform.

At block 508, the script is sent to the remote computing device. In an embodiment, the security layer is configured to allow execution of scripts signed with the certificate of the application management platform, thereby allowing the remote computing device to execute the script while the security layer is executing.

Although the various techniques have been described in language specific to structural applications and/or methodological acts, it is to be understood that the subject matter defined in the appended representations is not necessarily limited to the specific applications or acts described. Rather, the specific applications and acts are disclosed as example forms of implementing the claimed subject matter.

The disclosure presented herein also encompasses the subject matter set forth in the following clauses:

Clause 1: A method of remotely managing, by an application management platform, a computing device over a communications network, the method comprising:
  receiving a request to update a configuration of the computing device;
  determining that the computing device is executing a security layer that restricts execution of code on the computing device to an explicit list of software;
  dynamically selecting a script that fulfills the request to update the configuration of the computing device, wherein the script is signed with a certificate of the application management platform; and
  sending the script to the computing device, wherein the security layer is configured to allow execution of scripts signed with the certificate of the application management platform, thereby allowing the computing device to execute the script while the security layer is enforced.

Clause 2: The method of clause 1, wherein dynamically selecting comprises selecting an available signed script at the application management platform.

Clause 3: The method of any of clauses 1-2, further comprising linking the script with a version identifier using a custom file hierarchy and a Universal Naming Convention (UNC) network path.

Clause 4: The method of any of clauses 1-3, further comprising using an internal mapping to ensure that the computing device is receiving a correct version of the script.

Clause 5: The method of any of clauses 1-4, further comprising caching script transfers by using a Uniform Resource Locator (URL) of the computing device as a key.

Clause 6: The method of any of clauses 1-5, further comprising implementing:
a first cache for a mode of a target node with a sliding expiration policy; and
a second cache for configuration information.

Clause 7: The method of any of clauses 1-6, further comprising using a Fully Qualified Domain Name (FQDN) for a cluster of computing devices to distinguish between cluster and non-cluster connections.

Clause 8: The method of any of clauses 1-7, further comprising:
in response to determining that the computing device is a cluster of computing devices, opening a remote PowerShell session on the cluster;
executing a command to determine a resolved Domain Name System (DNS) for the cluster; and
using the resolved DNS to communicate with the cluster.

Clause 9: The method of any of clauses 1-8, further comprising implementing a synchronous module transfer which uses synchronous application programming interfaces (APIs) to identify signed module files from local gateway installation directories.

Clause 10: The method of any of clauses 1-9, further comprising implementing an asynchronous module transfer wherein each module is verified in a multiple-module transfer.

Clause 11: A computing device comprising:
a processing system; and
a memory storing computer-executable instructions thereupon which, when executed by the processing system, cause the computing device to perform operations comprising:
in response to receiving a request to update a configuration of a remote computing device, determining that the remote computing device is executing a security layer that restricts execution of code on the remote computing device to an explicit list of software;
dynamically selecting a script that fulfills a request to update a configuration of the remote computing device, wherein the script is signed with a certificate of an application management platform; and
sending the script to the remote computing device, wherein the security layer is configured to allow execution of scripts signed with the certificate of the application management platform, thereby allowing the remote computing device to execute the script while the security layer is executing.

Clause 12: The computing device of clause 11, the operations further comprising:
linking the script with a version identifier using a custom file hierarchy and a Universal Naming Convention (UNC) network path.

Clause 13: The computing device of any of clauses 11 and 12, the operations further comprising:
using an internal mapping to ensure that the computing device is receiving a correct version of the script.

Clause 14: The computing device of any of clauses 11-13, the operations further comprising:
further comprising caching script transfers by using a Uniform Resource Locator (URL) of the computing device as a key.

Clause 15: The computing device of any of clauses 11-14, the operations further comprising:
implementing:
a first cache for a mode of a target node with a sliding expiration policy; and
a second cache for configuration information.

Clause 16: The computing device of any of clauses 11-15, the operations further comprising:
using a Fully Qualified Domain Name (FQDN) for a cluster of computing devices to distinguish between cluster and non-cluster connections.

Clause 17: A system comprising:
a processing system; and
a memory storing computer-executable instructions thereupon which, when executed by the processing system, cause the system to perform operations comprising:
receiving a request to update a configuration of the computing device;
determining that the computing device is executing a security layer that restricts execution of code on the computing device to an explicit list of software;
dynamically selecting a script that fulfills the request to update the configuration of the computing device, wherein the script is signed with a certificate of an application management platform; and
sending the script to the computing device, wherein the security layer is configured to allow execution of scripts signed with the certificate of the application management platform, thereby allowing the computing device to execute the script while the security layer is executing.

Clause 18: The system of clause 17, the operations further comprising:
implementing a synchronous module transfer which uses synchronous application programming interfaces (APIs) to identify signed module files from local gateway installation directories.

Clause 19: The system of any of clauses 17 and 18, the operations further comprising:
implementing an asynchronous module transfer wherein each module is verified in a multiple-module transfer.

Clause 20: The system of any of the clauses 17-19, the operations further comprising:
in response to determining that the computing device is a cluster of computing devices, opening a remote PowerShell session on the cluster;
executing a command to determine a resolved Domain Name System (DNS) for the cluster; and
using the resolved DNS to communicate with the cluster.

What is claimed is:

1. A method of remotely managing, by an application management platform, a computing device over a communications network, the method comprising:
receiving a request to update a configuration of the computing device;
determining that the computing device is executing a security layer that restricts execution of code on the computing device to an explicit list of software;
dynamically selecting a script that fulfills the request to update the configuration of the computing device, wherein the script is signed with a certificate of the application management platform; and sending the script to the computing device, wherein the security layer is configured to allow execution of scripts signed with the certificate of the application management platform, thereby allowing the computing device to execute the script while the security layer is enforced;

wherein the application management platform comprises a cache for storing a mode of the computing device and configuration information, the mode having a sliding expiration policy.

2. The method of claim 1, wherein dynamically selecting comprises selecting an available signed script at the application management platform.

3. The method of claim 1, further comprising linking the script with a version identifier using a custom file hierarchy and a Universal Naming Convention (UNC) network path.

4. The method of claim 1, further comprising using an internal mapping to ensure that the computing device is receiving a correct version of the script.

5. The method of claim 1, further comprising caching script transfers by using a Uniform Resource Locator (URL) of the computing device as a key.

6. The method of claim 1, wherein the cache comprises:
a first cache for the mode of the computing device with a sliding expiration policy; and
a second cache for configuration information.

7. The method of claim 1, further comprising using a Fully Qualified Domain Name (FQDN) for a cluster of computing devices to distinguish between cluster and non-cluster connections.

8. The method of claim 1, further comprising:
in response to determining that the computing device is a cluster of computing devices, opening a remote session on the cluster;
executing a command to determine a resolved Domain Name System (DNS) name for the cluster; and
using the resolved DNS name to communicate with the cluster.

9. The method of claim 1, further comprising implementing a synchronous module transfer which uses synchronous application programming interfaces (APIs) to identify signed module files from local gateway installation directories.

10. The method of claim 1, further comprising implementing an asynchronous module transfer wherein each module is verified in a multiple-module transfer.

11. A computing device comprising:
a processing system; and
a memory storing computer-executable instructions thereupon which, when executed by the processing system, cause the computing device to perform operations comprising:
determining that a remote computing device is executing a security layer that restricts execution of code on the remote computing devices to an explicit list of software;
dynamically selecting a script that fulfills a request to update a configuration of the remote computing device, wherein the script is signed with a certificate of an application management platform; and
sending the script to the remote computing device, wherein the security layer is configured to allow execution of scripts signed with the certificate of the application management platform, thereby allowing the remote computing device to execute the script while the security layer is executing;

wherein the application management platform comprises a cache for storing a mode of the computing device and configuration information, the mode having a sliding expiration policy.

12. The computing device of claim 11, the operations further comprising:
linking the script with a version identifier using a custom file hierarchy and a Universal Naming Convention (UNC) network path.

13. The computing device of claim 11, the operations further comprising:
using an internal mapping to ensure that the remote computing device is receiving a correct version of the script.

14. The computing device of claim 11, the operations further comprising:
further comprising caching script transfers by using a Uniform Resource Locator (URL) of the remote computing device as a key.

15. The computing device of claim 11, the operations further comprising:
implementing:
a first cache for a mode of a target node with a sliding expiration policy; and
a second cache for configuration information.

16. The computing device of claim 11, the operations further comprising:
using a Fully Qualified Domain Name (FQDN) for a cluster of remote computing devices to distinguish between cluster and non-cluster connections.

17. A system comprising:
a processing system; and
a memory storing computer-executable instructions thereupon which, when executed by the processing system, cause the system to perform operations comprising:
receiving a request to update a configuration of a computing device;
determining that the computing device is executing a security layer that restricts execution of code on the computing device to an explicit list of software;
dynamically selecting a script that fulfills the request to update the configuration of the computing device, wherein the script is signed with a certificate of an application management platform; and
sending the script to the computing device, wherein the security layer is configured to allow execution of scripts signed with the certificate of the application management platform, thereby allowing the computing device to execute the script while the security layer is executing;

wherein the application management platform comprises a cache for storing a mode of the computing device and configuration information, the mode having a sliding expiration policy.

18. The system of claim 17, the operations further comprising:
implementing a synchronous module transfer which uses synchronous application programming interfaces (APIs) to identify signed module files from local gateway installation directories.

19. The system of claim 17, the operations further comprising:
implementing an asynchronous module transfer wherein each module is verified in a multiple-module transfer.

20. The system of claim 17, the operations further comprising:
- in response to determining that the computing device is a cluster of computing devices, opening a remote PowerShell session on the cluster;
- executing a command to determine a resolved Domain Name System (DNS) name for the cluster; and
- using the resolved DNS name to communicate with the cluster.

* * * * *